(12) United States Patent
Gogate

(10) Patent No.: US 7,695,016 B2  
(45) Date of Patent: Apr. 13, 2010

(54) BREAKAWAY STEERING SYSTEM

(75) Inventor: Vinayak Gogate, Maharashtra (IN)

(73) Assignee: Tata Motors Limited, Maharashtra (IN)

( * ) Notice: Subject to any disclaimer, the term of this patent is extended or adjusted under 35 U.S.C. 154(b) by 187 days.

(21) Appl. No.: 11/898,399

(22) Filed: Sep. 12, 2007

(65) Prior Publication Data

US 2008/0169632 A1    Jul. 17, 2008

(30) Foreign Application Priority Data

Sep. 27, 2006    (IN) .................... 1562/MUM/2006

(51) Int. Cl.  
*B62D 1/16* (2006.01)

(52) U.S. Cl. .................. 280/777; 280/779; 280/771; 180/78; 74/492; 464/182; 403/359.1

(58) Field of Classification Search ................. 280/777, 280/779, 93.502, 771; 180/78, 274; 74/492, 74/496, 498; 464/182; 403/359.1, 359.2, 403/359.3, 359.4, 359.5, 359.6, 383  
See application file for complete search history.

(56) References Cited

U.S. PATENT DOCUMENTS

| | | | |
|---|---|---|---|
| 4,746,144 A | 5/1988 | Kulczyk | |
| 2005/0156423 A1* | 7/2005 | Appleyard | .................. 280/777 |

\* cited by examiner

*Primary Examiner*—Ruth Ilan  
*Assistant Examiner*—Keith Frisby  
(74) *Attorney, Agent, or Firm*—Pearl Cohen Zedek Latzer, LLP

(57) ABSTRACT

A device and method for steering mechanism breakaway are disclosed. In order to avoid harmful steering column intrusion into the passenger compartment of a vehicle in the event of vehicle collision, an intermediate link between the steering column and the steering gearbox is disposed. The intermediate link comprises of an inner shaft and an outer tube which are connected via longitudinal matching splines to facilitate rotational engagement. In normal operation the inner shaft may longitudinally move inside the tube. The outer tube has openings along it and detachment means at one end to facilitate detachment of the shaft from the tube through the openings when the shaft moves longitudinally into the tube beyond a certain point due to movement of the steering gearbox towards the steering column during a collision.

9 Claims, 5 Drawing Sheets

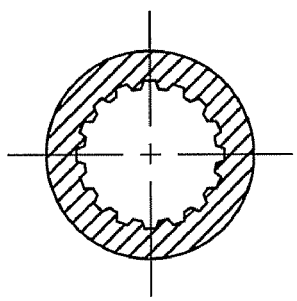 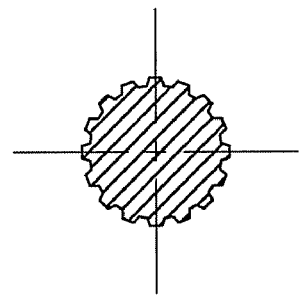
FIG.3  FIG.4
Prior Art  Prior Art
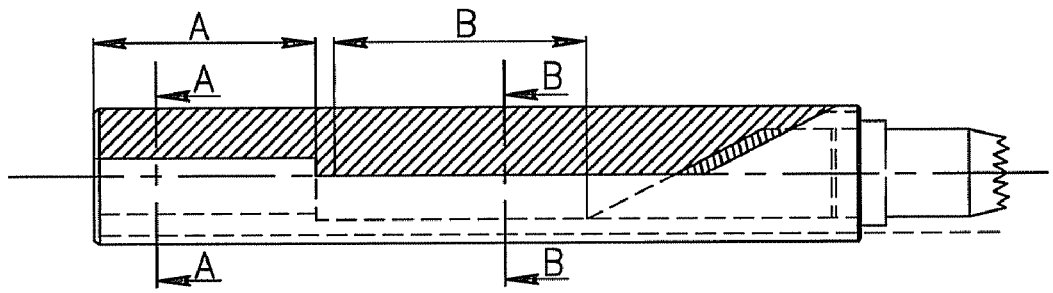
FIG.5
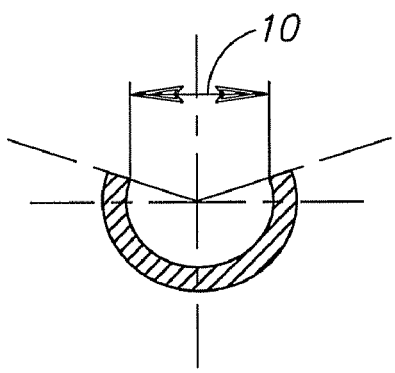 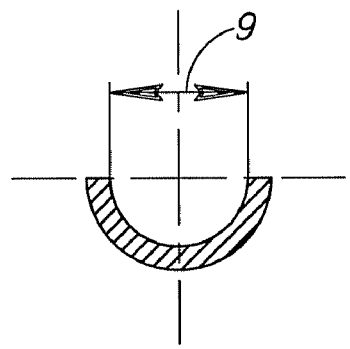
FIG.6  FIG.7

BREAKAWAY STEERING SYSTEM

CROSS-REFERENCE TO RELATED APPLICATIONS

This application claims the benefit of Indian Patent Application Serial Number 1562/Mum/2006, filed Sep. 27, 2006, which is incorporated in its entirety by reference herein.

FIELD OF INVENTION

The present invention relates to a steering system for steering mechanisms in vehicles for providing efficient breakaway of the steering linkage connecting the steering gearbox to the steering column to prevent harmful steering column intrusions in the passenger compartments in the event of a vehicle collision.

BACKGROUND OF INVENTION

In vehicles with body over chassis design & using worm-wormwheel steering gear a steering linkage is provided to connect the steering column and the steering gearbox. The purpose of this steering linkage is to transmit the torque applied at the steering wheel to the steering gear thus causing the required directional change of the vehicle. During a front-end collision of a vehicle, deformation occurs in the front end of the vehicle which will be transmuted to the steering column along with steering wheel results into intrusion of sufficient magnitude which can cause fatal injuries to the driver. It is therefore of paramount importance to provide a mechanism which would minimize or eliminate the steering intrusion into the driver's compartment.

U.S. Pat. No. 4,746,144 discloses a breakaway steering assembly constructed such that the steering gear will mechanically separate from the steering shaft to reduce the potential injury to the driver in the event of a front-end collision. Said invention discloses a breakaway steering assembly comprising a hollow tube and a solid shaft which is kept together by means of pins and reinforcement metal band. The deflection member is in the form of a ramp that extends at an acute angle from the wall (18) of the hollow tube (14) into the channel (20). The diameter of the tube is greater than the diameter of the part of channel, which normally receives the shaft. The solid shaft has a projection, which is normally axially located between the metal band and the alignment tabs. A shear pin secures the tube and the shaft together so that the tube and the shaft functions as a unit during normal operations. However, in a collision, the shear pin will fail at a predetermined axial force, causing the hollow tube to move axially until the ramp contacts the angled end of the solid shaft. The movement of the end of the shaft along the ramp begins to drive the shaft out of the tube. This motion makes the metal band to be in tension until it is fractured by the projection and also causes the alignment tabs to bend thus allowing the shaft to leave the tube.

The disadvantage of the above said invention is that since it uses shear pin and reinforcement band, to keep the assembly together, the breaking away of the link requires force more than the reactions generated by the shear pin as well as the reinforcement band during separation. The dimensional variations of the channel and shaft will result into variable breakaway force & therefore would require a selective assembly of these parts, though they are within the specified tolerance band. While adapting this mechanism for use in a vehicle, an additional sliding joint will be required to be put in series to take care of the undulations caused by the vehicle environment. Also, the entire size of the mechanism would be bigger which is not desirable where there is a space constraint. If the tube and shaft separates during handling or during normal vehicle operation, they would require replacement.

The FIGS. 1 to 4 of the enclosed drawings show a prior art steering system. Wherein FIG. 1 shows complete layout of steering system FIG. 2 shows enlarged view of telescopic joint in the intermediate link FIG. 3 shows a sectional view of outer tube of the telescopic joint at A-A in FIG. 2

FIG. 4 shows a sectional view of inner shaft of the telescopic joint at A-A in FIG. 2

The steering linkage begins with the steering wheel (1) in the passenger compartment. It is mounted on the steering column (2). The steering column is connected to the steering gearbox (4) through an intermediate link (3). In the event of a crash, the steering gearbox (4) is pushed backwards. The displacement of the steering gearbox (4) is transmitted to the one end of the steering column (2) through a telescopic intermediate link (3) when its telescopic movement is exhausted. One of the ways to restrict the steering column movement is to break the intermediate link (3) to separate its linkage to the steering gearbox (4) under high structural movements, which would occur in the event of a crash.

OBJECTS OF INVENTION

The main object of this invention is to provide a steering linkage mechanism which minimizes the steering column intrusions inside the passenger compartment of a vehicle in the event of collision.

Another object of this invention is to provide a steering linkage mechanism compatible to space constraints.

Yet another object of this invention is to provide a steering linkage mechanism which is simple in construction and cost effective.

Yet another object of this invention is to provide a steering linkage mechanism which is easy to repair.

BRIEF SUMMARY OF INVENTION

The present invention describes an improved breakaway steering system, which provides detachment of the linkage on displacement of the steering gearbox, due to structural deformations, in a front-end collision of the vehicle. The various parts of the mechanism are held at their place by the geometry constraints in the normal function of the vehicle.

The breakaway steering linkage according to this invention comprises an intermediate link connecting the steering column to the steering gearbox. The intermediate link comprises an inner shaft and an outer tube connected together through a telescopically splined joint so that the outer tube can move axially over and with respect to the inner shaft. The inner shaft is provided with external splines & the outer tube has been provided with internal splines. The outer tube is shaped or cut in such a way that the open section is bigger than inner shaft shank but smaller than its spline diameter. With this the splines are not allowed to disengage during normal course of operation but would allow transverse movement of the inner shaft shank during disengagement. Also the outer tube is further shaped or cut such that the gap created is sufficient enough to allow transverse movement of the splined end through it during separation. A ramp is provided on the other end of the outer tube extending downward at an angle from the top end surface of the outer tube such that it promotes detachment of the splined end during its longitudinal movement. It is located in such a way that the inner shaft touches it when the splined end is completely detached from the splines on the outer tube.

The present invention is superior in comparison to U.S. Pat. No. 4,746,144 in the following respect.
  a. the present invention does not have shear pins or metal bands to hold the parts together. The parts are held at their place by geometry constraints in the vehicle. The above said invention of U.S. Pat. No. 4,746,144 requires a force more than the reactions generated by these shear pin &as well as the metal band. However, the present invention has a sliding joint and therefore practically does not require any force of separation.
  b. The present invention uses fewer parts and is of lesser size in comparison to the U.S. Pat. No. 4,746,144.
  c. The said U.S. Pat. No. 4,746,144 invention does not allow sliding of the male & female parts & therefore would require an additional sliding joint when being used in vehicle due to dimensional variations. In the present invention, sliding feature is embedded in the construction & suitable to absorb the dimensional variations arising while fitting in the vehicle, Accordingly, the invention relates to a breakaway steering system for a vehicle comprising: a steering gear box disposed laterally of a vehicle body at a front portion thereof; a steering wheel mounted inside the vehicle at an opposite end from the steering gearbox; said steering wheel and steering gearbox being connected by means of a steering column and an intermediate link; said intermediate link comprising an inner shaft and an outer tube joined through a telescopic splined joint; outer tube is provided with at least two openings in such a way that the inner shaft remains engaged with outer tube during normal course of operation and allows transverse motion of the inner shaft during detachment; a means of detachment provided at the end of a the outer column tube which facilitates detachment of the splined end during its longitudinal movement in the event of a collision.

BRIEF DESCRIPTION OF DRAWINGS

The foregoing and other aspects will become apparent from the following detailed description of the invention when considered in conjunction with the accompanying drawing figures which in no way should be considered to limit the scope of the invention but should only be considered as describing the invention by way of illustrated examples.

FIGS. 1 to 4 show the prior art breakaway steering system with enlarged view of the breakaway mechanism and details of the spline joint.

FIG. 5 shows the side view of the outer tube according to the invention.

FIGS. 6 and 7 show the sectional views of the openings provided on the outer tube of the intermediate link shown in FIG. 5.

DETAILED DESCRIPTION OF INVENTION

Figures 1, 2:
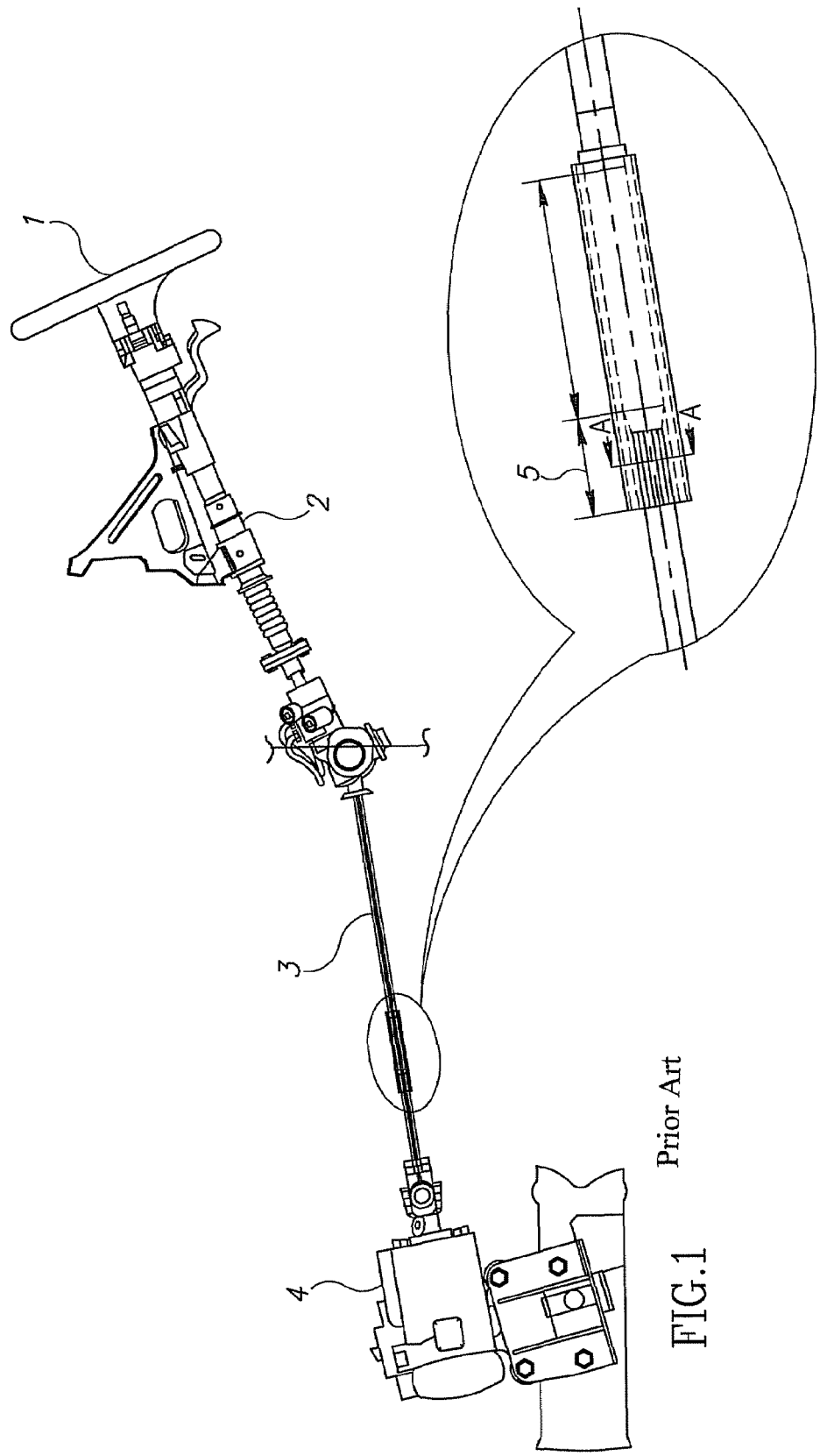

The invention will now be described with reference to FIGS. 5 to 10.

According to the invention the outer tube (6) is longitudinally shaped or cut as can be seen in FIGS. 5 to 7. The first opening is shown in FIG. 6 and the second opening is shown in FIG. 7. The opening (a) shown in FIG. 5 is provided in such a manner that the width (10) across the opening is more than the shank diameter (11) of the inner shaft and less than the spline diameter (12) of the inner shaft. The opening (b) shown in FIG. 5 is provided in such a manner that the width (9) across the cut is more than the shank diameter(11) and spline diameter(12) of the inner shaft. Such opening (a) made to the outer tube ensures that the splines do not disengage during normal course of operation, however, ensures transverse movement of the inner shaft (5) during disengagement. A second opening (b) made on the outer tube (6) is provided such that the width (9) is sufficient enough to allow transverse movement of the splined end through it during disengagement.

Figure 8:
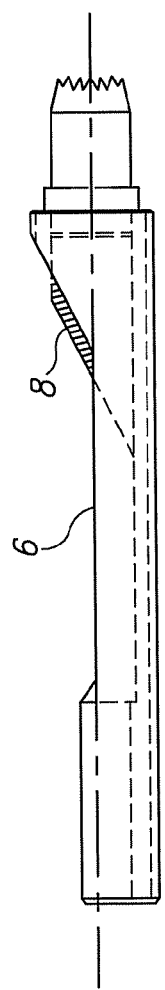
FIG. 8 shows outer tube and inner shaft in accordance with this invention.
Figure 8:
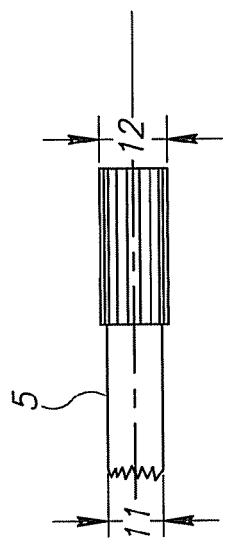

As shown in FIG. 8 the ramp (8) is provided on outer tube, at a predetermined distance from the end of the splines on outer tube, to promote the separation of inner shaft. During normal operation of the assembly, the inner shaft (5) is axially placed at a predetermined distance away from the downward sloping ramp (8) without being detached from splines on the outer tube during its engagement due to its vehicle installation dimensions configuration. The torque applied at the steering wheel is transmitted to the steering gearbox through the intermediate link (3) thus causing the required directional change of the vehicle.

Figure 9:
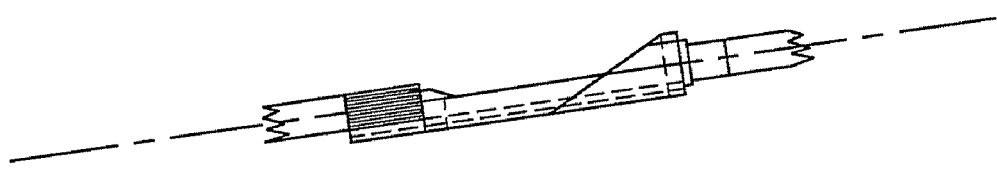
FIG. 9 shows separation of the inner shaft in the event of collision.
Figure 9:
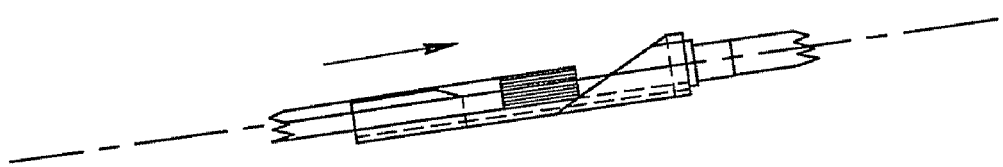
Figure 9:
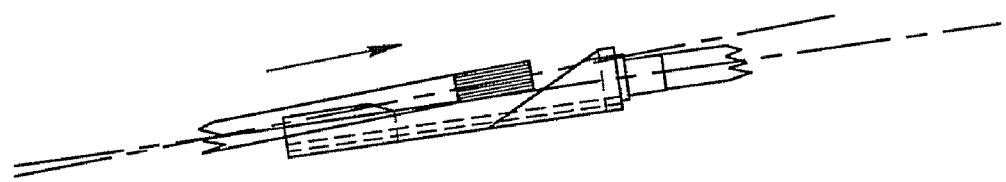
Figure 9:
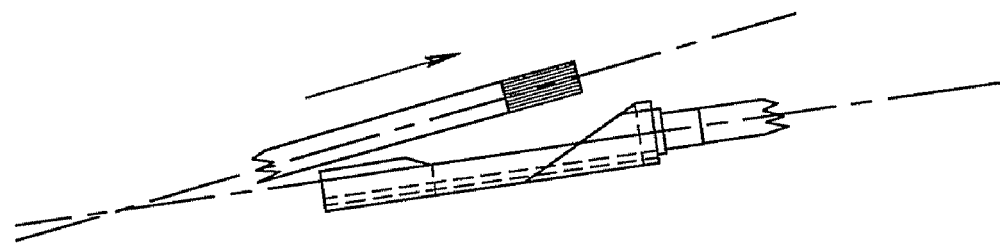
Figure 10:
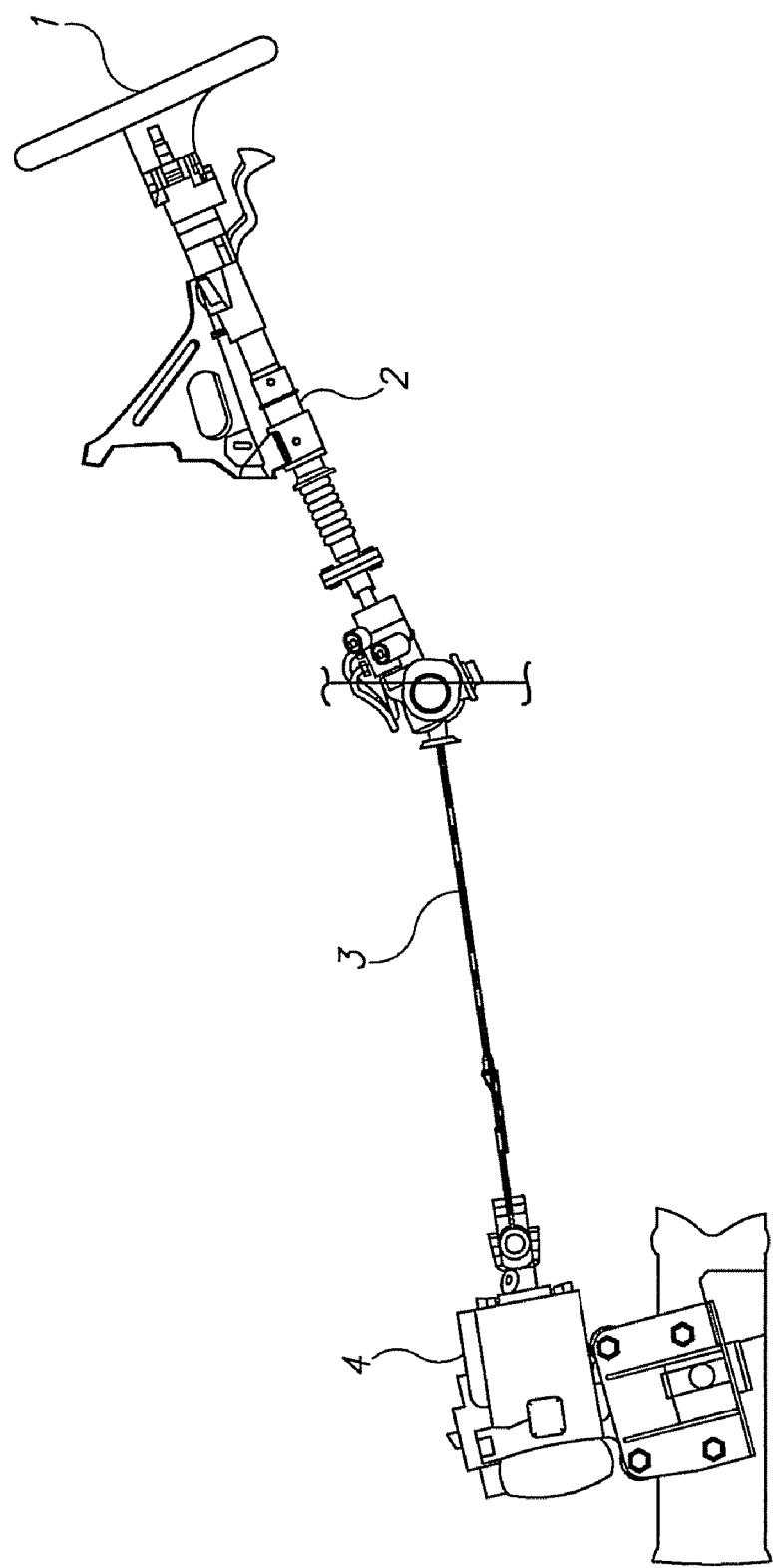
FIG. 10 shows layout of steering system with break away steering linkage in accordance with this invention.

FIG. 9 illustrates the separation of inner shaft in the event of collision and the operation of the mechanism according to this invention during front-end collision of the vehicle. In the event of a front-end collision the steering gear box (4) moves rearwards. This movement pushes the intermediate link (3) to telescope into one another. The length of the intermediate link (3) is reduced till the inner shaft (5) is completely detached from the splines on the outer tube. At this point the free end of the inner shaft (5) of the intermediate link (3) is pushed away by the ramp (8), which detaches the inner shaft (5) from the outer lube (6). With this mechanism, the intermediate link is broken and any further movement of the steering gear box is not transmitted towards the passenger compartment.

The foregoing description provides the detailed working of the invention by way of explanation and illustrations. It is to be understood that modification may now suggest itself to those skilled in the art and that this invention is not limited to the specific embodiment disclosed, except as set forth in the appended claims.

I claim:

1. A breakaway steering system for a vehicle comprising: a steering gear box-disposed laterally of a vehicle body at a front portion thereof; a steering wheel mounted inside the vehicle at an opposite end from the steering gearbox; said steering wheel and steering gearbox being connected by means of a steering column and an intermediate link; said intermediate link comprising of an inner shaft and an outer tube joined through splines; said outer tube being provided with at least two openings in such a way that the inner shaft remains engaged with said outer tube during normal course of operation and allows transverse motion of the inner shaft during detachment; a means of detachment provided at another side of said outer tube which facilitates detachment of the splined end during its longitudinal movement in the event of a collision.

2. The breakaway steering system as claimed in claim 1, wherein the width of first opening is more than shank diameter and less than spline diameter of the said inner shaft and width of second opening is more than said shank diameter and spline diameter of the said inner shaft.

3. The breakaway steering system as claimed in claim 1, wherein the said means of detachment is a ramp extending downward at an angle from the top end surface of the outer tube.

4. The breakaway steering system as claimed in claim 3 wherein said ramp is rigidly attached to said outer tube.

5. The breakaway steering system as claimed in claim 3 wherein said ramp is projecting out of the surrounding outer tube.

6. The breakaway steering system as claimed in claim 3 wherein the angle of ramp provided is less than an angle of chamfer provided at the end of inner shaft.

7. The breakaway steering system as claimed in claim 1 wherein the distance between lower end of the ramp and the end point of splines on outer tube is greater than the splined length of the inner shaft.

8. The breakaway steering system as claimed in claim 1 wherein said openings are merged by a smooth surface.

9. The breakaway steering system as claimed in claim 1, wherein said detachment means is placed at a predetermined distance from the end of the splines on outer tube during normal operation of the vehicle.

* * * * *